(12) United States Patent
Pütter et al.

(10) Patent No.: US 6,770,187 B1
(45) Date of Patent: Aug. 3, 2004

(54) METHOD FOR ELECTROCHEMICALLY PRODUCING AN ALKALI METAL FROM AN AQUEOUS SOLUTION

(75) Inventors: Hermann Pütter, Neustadt (DE); Günther Huber, Ludwigshafen (DE); Kerstin Schierle-Arndt, Mannheim (DE); Dieter Schläfer, Ludwigshafen (DE); Josef Guth, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 194 days.

(21) Appl. No.: 10/069,369

(22) PCT Filed: Aug. 24, 2000

(86) PCT No.: PCT/EP00/08278

§ 371 (c)(1),
(2), (4) Date: Feb. 25, 2002

(87) PCT Pub. No.: WO01/14616

PCT Pub. Date: Mar. 1, 2001

(30) Foreign Application Priority Data

Aug. 24, 1999 (DE) .......................................... 199 40 069

(51) Int. Cl.⁷ .............................. C25C 1/02; C25C 7/04
(52) U.S. Cl. ........................ 205/560; 204/252; 204/296
(58) Field of Search ................................ 204/252, 295, 204/296; 205/560

(56) References Cited

U.S. PATENT DOCUMENTS

| 4,108,743 | A | * | 8/1978 | Minck ........................ 205/367 |
| 4,156,635 | A | | 5/1979 | Cooper et al. |
| 5,580,430 | A | * | 12/1996 | Balagopal et al. .......... 204/252 |
| 6,368,486 | B1 | * | 4/2002 | Thompson et al. ......... 205/406 |

FOREIGN PATENT DOCUMENTS

| DE | 32 03 515 | 8/1983 |
| EP | 835 951 | 4/1998 |
| GB | 1155927 | 6/1969 |

OTHER PUBLICATIONS

Development of a Bipolar Cell . . . Cooper et al. 280–290; Electrochemical Soc. Proceedings, vol. 95–11.

Ind.Anorganische Chem.,Buechner et al., 228–229.

8.1.4. Tetrafluoroethylene—Solid State Ionics, Robertson et al.

\* cited by examiner

*Primary Examiner*—Roy King
*Assistant Examiner*—Harry D Wilkins, III
(74) *Attorney, Agent, or Firm*—Keil & Weinkauf

(57) ABSTRACT

The invention relates to an electrolysis cell comprising an anode compartment which comprises an aqueous solution of at least one alkali metal salt, a cathode compartment and a solid electrolyte which separates the anode compartment and the cathode compartment from one another, wherein that part of the surface of the solid electrolyte which is in contact with the anode compartment and/or that part of the surface of the solid electrolyte which is in contact with the cathode compartment has/have at least one further ion-conducting layer.

23 Claims, No Drawings

METHOD FOR ELECTROCHEMICALLY PRODUCING AN ALKALI METAL FROM AN AQUEOUS SOLUTION

The present invention relates to an electrochemical process for obtaining alkali metals from aqueous solution by an electrochemical process, and also to an electrolysis cell for carrying out this process. The invention further relates to an electrochemical process for recycling alkali metals from aqueous solution.

For the purposes of the present invention, alkali metals are lithium, sodium and potassium.

Lithium is important as a basis for inorganic chemistry and is used in a variety of applications, such as lithium batteries, organolithium compound preparation, and addition to aluminum or to magnesium to give alloys. Lithium is prepared industrially by melt electrolysis of a eutectic mixture of lithium chloride and potassium chloride at from 400 to 460° C. (Ullmann's Encyclopedia of Industrial Chemistry, Sixth Edition, 1998 Electronic Release). This process has high energy consumption (28–32 kWh/kg of Li). The process also has the serious disadvantage that only anhydrous lithium chloride can be used. The lithium chloride, which is mainly available as aqueous solution, therefore has to be treated by a high-energy process to give the anhydrous solid. Since lithium chloride is hygroscopic, its drying and handling are particularly expensive.

Organic reactions with lithium frequently produce aqueous lithium salt solutions. The increasing use of lithium batteries also produces lithium-containing waste, and this, too, can be converted into aqueous lithium solutions. Since lithium is very expensive, even in the form of its salts, recycling of lithium is of interest.

U.S. Pat. No. 4,156,635 and J. F. Cooper et al., Proc. Electrochem. So. 1995, pp. 95–11, 280–290, describe a process for the electrochemical preparation of lithium from an aqueous lithium salt solution by using a lithium amalgam electrode. For this, a lithium solution, in particular a lithium hydroxide solution, is electrolyzed using an amalgam cathode. This forms lithium amalgam, which becomes the anode in a second electrolysis cell. Lithium cathode and amalgam anode here are separated with the aid of boron nitride seals. The electrolyte in this second electrolysis cell is a 2 cm salt melt of two alkali metal iodides (preferably LiI and CsI or, respectively, LiI and KI), while lithium metal is deposited at the cathode. The current density here is from 1 to 4 kA/m$^2$ without mass transfer limitation. In the recovery of lithium from the amalgam in this process the current yield achieved is only from 81 to 87%. A particularly serious problem is that the lithium obtained has mercury contamination, since the mercury can diffuse through the electrolyte.

Sodium is important as a basis for inorganic chemistry and is used for preparing sodium amide, sodium alcoholates and sodium borohydride, for example. It is obtained industrially by the Downs process, by electrolyzing molten sodium chloride. This process has high energy consumption of $\geq 10$ kWh/kg of sodium (Büchner et al., Industrielle Anorganische Chemie, 2nd edition, Verlag Chemie, pp. 228 et seq.). The process also has the serious disadvantage that the electrolysis cells are damaged by solidification of the salt melt on shutdown. The sodium metal obtained by the Downs process also has the disadvantage of calcium contamination caused by the process, and although subsequent purification reduces the residual content of calcium it never removes it entirely.

Potassium is also important as a basis for inorganic chemistry and is used for preparing potassium alcoholates, potassium amides and potassium alloys, for example. Nowadays it is primarily obtained industrially by reacting potassium chloride with sodium. This first gives NaK, which is then fractionated by distillation. A good yield is obtained by constantly drawing off potassium vapor from the reaction zone, thus shifting the reaction equilibrium toward the potassium side (Ullmann's Encyclopedia of Industrial Chemistry, 6th edition 1998, Electronic Release). A disadvantage is that the process operates at high temperatures (870° C.). In addition, the resultant potassium comprises about 1% of sodium contaminant and therefore still requires purification by a further rectification. The greatest disadvantage is that the sodium used is expensive. The reason for this is that sodium is obtained industrially by the Downs process, by electrolyzing molten sodium chloride, and the energy usage necessary here is at least 10 kWh/kg of sodium, corresponding to about 5.3 kWh/kg of potassium (for 100% yield).

GB 1,155,927 describes a process which uses a solid sodium ion conductor, e.g. $\beta$-$Al_2O_3$, with amalgam as anode and sodium as cathode, to obtain sodium metal electrochemically from sodium amalgam. However, the process described in GB 1,155,927 does not give the results described there with regard to sodium conversion, product purity and current density. The system described there, furthermore, develops instability over the course of a few days when the claimed temperature range is adhered to. Electrolysis cells which are used to prepare alkali metal by an electrochemical process and which have a solid ion conductor are frequently unsuitable for permanent operation over a long period. One reason for this is that after a certain period of operation the solid ion conductor becomes mechanically unstable.

It is an object of the present invention, therefore, to develop a process which does not have the disadvantages described above (high energy consumption, calcium content in the sodium, high temperature, etc.). A further object is to provide an electrolysis cell suitable for carrying out this process. A further object is to find a process which enables recycling of alkali metals from aqueous alkali metal waste, in particular lithium from aqueous lithium waste.

We have found that this object is achieved by means of a process which comprises carrying out an electrolysis in a novel electrolysis cell with a solid ion conductor. The ion conductor here separates the electrolysis cell into two parts. In one part is the liquid alkali metal which serves as cathode. In the other part, and in contact with an anode, is an aqueous solution of a salt of this same alkali metal. Any desired commercially available anode materials can be used as anode.

Alkali metal ion conductors of this type are frequently not resistant to water and/or to alkali metals, and the experiment therefore leads to damage of the alkali metal ion conductors after only a short period. This damage can comprise either mechanical failure of the ion conductor or loss of its conductivity. A further aim of the invention is therefore to keep the ion conductors stable over a prolonged working life. The working life of the ion conductors can be increased markedly by applying an ion-conducting protective layer to the appropriate side of the ion conductor.

The present invention therefore also provides an electrolysis cell comprising an anode compartment which comprises an aqueous solution of at least one alkali metal salt, a cathode compartment and a solid electrolyte which separates the anode compartment and the cathode compartment from one another, wherein that part of the surface of the solid electrolyte which is in contact with the anode compartment and/or that part of the surface of the solid electrolyte which is in contact with the cathode compartment has/have at least one further ion-conducting layer.

The present invention also provides a process for preparing an alkali metal from an aqueous solution comprising at least one salt of this alkali metal, using this electrolysis cell.

There are generally no restrictions in relation to the aqueous alkali metal salt solution in the anode compartment, and any suitable alkali metal salt solution may be used. Besides pure aqueous solutions, it is also possible to use mixtures with water-miscible organic solvents, as long as the organic solvents are stable under the reaction conditions. Examples of solvents of this type are alcohols, e.g. methanol and ethanol, and also carbonates, e.g. propylene or ethylene carbonate.

There are likewise no restrictions in relation to the shape and design of the anode compartment, as long as it is certain that the walls of the anode space are resistant to the anode solution and that that part of the surface of the solid electrolyte which is in contact with the anode compartment is sufficient for the process to be carried out to prepare the alkali metal.

The novel process here is generally carried out with the aqueous alkali metal salt solution in motion in the anode compartment and the anode dipping into the aqueous solution. The motion of the solution may be brought about here by any desired means, preferably stirring by stirring equipment or circulating by pumps.

The anode dipping into the aqueous solution may be of any commercially available anode material. Examples of suitable anode materials are precious metals, such as platinum, or metal oxides based on titanium, or mixed oxides of the $RuO_xTiO_x$ type, or else graphite, carbon electrodes or lead dioxides.

A helium-tight alkali-metal-ion-conducting solid electrolyte separates the anode space and the cathode space from one another in the novel electrolysis cell.

The ion conductors here preferably fulfill the following conditions:
1. The ion conductors have good alkali metal ion conductivity at the reaction temperature ($\sigma \geq 0.005$ S/cm).
2. The ion conductors have negligibly low electron conductivity.

Materials which may be used for this purpose in preparing sodium are ceramics, such as NASICON (Na+ super ionic conductor), the composition of which is given in detail in EP-A 0 559 400 and in A. D. Robertson, A. R. West, A. G. Ritchie, *Solid State Ionics,* 1997, 104, pp. 1–11 and references cited there, in particular page 3, left-hand column. Sodium-ion-conducting glasses, and also zeolites and feldspars, are also suitable. Preference is given to the use of sodium-β"-aluminum oxide, sodium-β-aluminum oxide or sodium-β/β"-aluminum oxide.

A wide variety of materials may also be used when preparing potassium. Ceramics may be used, as may glasses. Examples of materials which may be used are the following: $KBiO_3$ (T. N. Nguyen et al., *Chem. Mater.,* 1993, 5, pp. 1273–1276), gallium oxide-titanium dioxide-potassium oxide systems (S. Yoshikado et al., *Solid State Ionics,* 1992, 53–56, pp. 754–762), aluminum oxide-titanium dioxide-potassium oxide systems and KASICON (K+ super ionic conductor), the composition of which is described in detail in M. Lejeune et al., *J Non-Cryst. Solids,* 1982, 51, pp. 273–276). Preference is given to the use of potassium-β"-aluminum oxide, potassium-β-aluminum oxide or potassium-β/β"-aluminum oxide, which may be prepared starting from sodium-β"-aluminum oxide, sodium-β-aluminum oxide and, respectively, sodium-β/β"-aluminum oxide by cation exchange.

A wide variety of materials may also be used when preparing lithium. In particular, ceramics materials or glasses may be used.

The following solid electrolytes are particularly suitable for preparing lithium by the novel process:
1. Li-β"-$Al_2O_3$ or Li-β-$Al_2O_3$, which may be prepared from Na-β"-$Al_2O_3$ and, respectively, Na-β-$Al_2O_3$ by exchanging the sodium ions for lithium ions (O. Schäf, T. Widmer, U. Guth, *Ionics,* 1997, 3, pp. 277–281).
2. Lithium analogs of NASICON ceramics, which are composed of an $[M_2(PO_4)_3]$ network, where M=Zr, Ti, Ge, Hf. These have the general composition $Li_{1-x}M_{2-x}A_x(PO_4)_3$ or $Li_{1+x}M_{2-x}M_x(PO_4)_3$, where M=Zr, Ti, Ge, Hf; A=Nb, Ta; In, Sc, Ga, Cr, Al (A. D. Robertson, A. R. West, A. G. Ritchie, *Solid State Ionics,* 1997, 104, pp. 1–11, and references cited there).
3. LISICONs, which have $\gamma\pi$-$Li_3PO_4$ structure and the composition $Li_{2+2x}Zn_{1-x}GeO_4$, where $-0.36 < x < +087$ or $Li_{3+x}Y_{1-x}X_xO_4$ where X=Si, Ge, Ti and Y=P, V, Cr (A. D. Robertson, A. R West, A. G. Ritchie, *Solid State Ionics* 1997, 104, pp. 1–11 and references cited there).
4. Lithium ion conductors with perovskite structure and the general composition $Li_{0.5-3x}La_{05+x}TiO_3$ and, respectively, $Li_{0.5-3x}Ln_{0.5+x}TiO_3$ (A. D. Robertson, A. R. West, A. G. Ritchie, *Solid State Ionics,* 1997, 104, pp. 1–11 and references cited there, EP-A 0 835 951.
5. Sulfidic glasses (R. Mercier, J. P. Malugani, B. Fahys, G. Robert, *Solid State Ionics,* 1981, 5, pp. 663–666; U.S. Pat. No. 4,465,746; S. Sahami, S. Shea, J. Kennedy, *J Electrochem Soc.,* 1985, 132, pp. 985–986).

However, preference is given to lithium-β"-aluminum oxide, lithium-β-aluminum oxide and lithium-β/β"-aluminum oxide, which in each case may be prepared starting from sodium-β"-aluminum oxide, sodium-β-aluminum oxide and, respectively, sodium-β/β"-aluminum oxide by cation exchange. Lithium analogs of NASICON ceramics are also preferred.

The present invention therefore also provides an electrolysis cell as described above, wherein
(a) the at least one alkali metal salt is a lithium salt or a mixture made from two or more of these, and the solid electrolyte has been selected from the group consisting of lithium-β-aluminum oxide, lithium-β"-aluminum oxide, lithium-β/β"-aluminum an oxide and lithium analogs of NASICON ceramics or
(b) the at least one alkali metal salt is a sodium salt or a mixture made from two or more of these, and the solid electrolyte has been selected from the group consisting of sodium-β-aluminum oxide, sodium-β"-aluminum oxide, sodium-β/β"-aluminum oxide, and NASICON ceramics, or
(c) the at least one alkali metal salt is a potassium salt or a mixture made from two or more of these, and the solid electrolyte has been selected from the group consisting of potassium-β-aluminum oxide, potassium-β"-aluminum oxide, potassium-β/β"-aluminum oxide and potassium analogs of NASICON ceramics.

It is appropriate for the solid electrolyte to have the form of a thin-walled but nevertheless pressure-resistant tube closed at one end (EP-B 0 424 673), to the open end of which an electrically insulating ring has been applied (GB 2 207 545, EP-B 0 482 785) by means of helium-tight and likewise electrically insulating glass soldering. The wall thickness of the alkali-metal-ion-conducting solid electrolyte is generally from 0.3 to 5 mm, preferably from 1 to 3 mm and particularly preferably from 1 to 2 mm.

The cross-sectional shape of the tube closed at one end is circular in the preferred embodiment. However, other possible cross-sectional shapes are those with an enlarged surface which may be derived from a combination of two or more circular areas, for example.

As stated above, use is generally made of solid electrolytes which in a helium leak test have leak rates below $10^{-9}$ (mbar.l)/s, i.e. are helium-tight to the limit of detectability. The strict leakproofing requirements are essential, since oxygen and/or atmospheric moisture must always be kept away from the alkali metal. It is moreover necessary for the alkali metal and aqueous solution to be separated from one another, since it is otherwise impossible to ensure reliable operation of the electrolysis cell or, respectively, reliable execution of the novel process, since the reaction between water or moisture on the one hand and alkali metal on the other is strongly exothermic.

For the purposes of the present invention, the composition of the at least one ion-conducting layer which relates to that surface of the solid electrolyte which is in contact with the anode compartment and/or with the cathode compartment, as described above, may generally be any compound which conducts the ions of the alkali metal to be prepared in the novel process and is resistant to the reaction conditions. For the purposes of the present invention, the term "reaction conditions" comprises both the physical conditions, such as electrolysis voltage, temperature or pressure, and the chemical conditions, such as the pH of the reaction or the composition of the anolyte or catholyte.

In one preferred embodiment, the present invention provides an electrolysis cell as described above, wherein the at least one ion-conducting layer which relates to that surface of the solid electrolyte which is in contact with the anode compartment is a polymer electrolyte (for lithium: L. Kavan et al., *Chem. Rev.*, 1997, 97, pp. 3061–3082, for example, and references cited there; for sodium: NAFION®, for example (a DuPont trade name for ion exchanger membranes made from a tetrafluoroethylene-perfluorovinyl ether copolymer with carboxylic acid groups, as described in Ullmanns Enzyklopädie, 1999, Wiley-VCH)), a ceramic electrolyte (perovskite structures for Li, Na, K; LISICON or lithium analogs of NASICON ceramics for Li; NASICON for Na; KASICON for K), a compound which intercalates the alkali metal ions of the at least one alkali metal salt of the aqueous solution of the anode compartment, or a mixture made from two or more of these.

In another preferred embodiment, the present invention provides an electrolysis cell as described above, wherein the at least one ion-conducting layer which relates to that surface of the solid electrolyte which is in contact with the cathode compartment is an alkali metal salt, where the alkali metal is identical with that of the alkali metal salt of the aqueous solution of the anode compartment, a compound which intercalates the alkali metal ions of the at least one alkali metal salt of the aqueous solution of the anode compartment, or a mixture made from two or more of these.

In a more preferred embodiment, the present invention provides an electrolysis cell as described above, wherein
  (a) the at least one alkali metal salt of the aqueous solution of the anode compartment is a lithium salt or a mixture made from two or more of these, and
    (aa) the alkali metal salt which relates to that surface of the solid electrolyte which is in contact with the cathode compartment has been selected from the group consisting of LiOH, $LiNH_2$, LiCl, LiBr, LiI, LiOR and a mixture made from two or more of these,
    (bb) the compound which intercalates lithium ions is, for example, graphite, $C_6Li$, $LiCoO_2$, $LiNiO_2$, $LiMnO_2$ or a mixture of these, or
  (b) the at least one alkali metal salt of the aqueous solution of the anode compartment is a sodium salt or a mixture made from two or more of these, and
    (aa) the alkali metal salt which relates to that surface of the solid electrolyte which is in contact with the cathode compartment has been selected from the group consisting of NaOH, $NaNH_2$, NaCl, NaBr, NaI, NaOR and a mixture made from two or more of these,
    (bb) the compound which intercalates sodium ions is graphite, $C_8Na$ or a mixture of these, or
  (c) the at least one alkali metal salt of the aqeuous solution of the anode compartment is a potassium salt or a mixture made from two or more of these, and
    (aa) the alkali metal salt which relates to that surface of the solid electrolyte which is in contact with the cathode compartment has been selected from the group consisting of KOH, $KNH_2$, KCl, KBr, KI, KOR and a mixture made from two or more of these,
    (bb) the compound which intercalates potassium ions is graphite, $C_8K$ or a mixture of these,
where R is straight-chain or branched-chain alkyl having from 1 to 5 carbon atoms.

For the purposes of the novel process, any conceivable suitable method of the prior art may be used to apply the alkali metal salts MOH, $MNH_2$, MCl, MBr, MI or MOR, where M is Li, Na or K, to the solid electrolyte. In preferred embodiments these salts are applied to the solid electrolyte in the form of a melt, an aqueous solution or an alcoholic solution.

The present invention therefore also provides a process as described above, wherein that part of the surface of the solid electrolyte which is in contact with the cathode compartment is conditioned, and the at least one alkali metal salt used for the conditioning is LiOH, $LiNE_2$, LiCl, LiBr, LiI, LiOR or a mixture made from two or more of these, or NaOH, $NaNH_2$, NaCl, NaBr, NaI, NaOR or a mixture made from two or more of these, or KOH, $KNH_2$, KCl, KBr, KI, KOR or a mixture made from two or more of these, in the form of a salt melt and/or aqueous solution and/or alcoholic solution.

For the purposes of the novel process it is, of course, also possible for the conditioning to be carried out in two or more steps in sequence, in which the at least one chemical compound or the mixture made from two or more of these may be identical or different in the individual conditioning steps.

For the purposes of the present invention it is possible for either that surface of the solid electrolyte which is in contact with the anode compartment or that surface of the solid electrolyte which is in contact with the cathode compartment to have at least one of the ion-conducting layers as mentioned and described above. In one preferred embodiment, however, both surfaces have at least one of the ion-conducting layers mentioned. For the purposes of the present application, "both" surfaces are not "two" surfaces in the sense of the number 2, but two types of surface differing in the compartment of the electrolysis cell with which they are in contact. The term "both" surfaces therefore includes reference to a design of the novel cell in which, for example, two sections of the surface of the solid electrolyte are, for example, in contact with the anode compartment and one section of the surface of the solid electrolyte is in contact with the cathode compartment.

The materials of which the cathod is composed differ, depending on which alkali metal is to be prepared by the novel process.

In one preferred embodiment, the cathode is composed of the alkali metal which is to be prepared by the novel process.

For the purposes of the novel process, the reaction temperature is selected to be as high as possible, and the temperature limit here in the anode compartment is determined by the boiling point of the aqueous solution used of the alkali metal salt, at the pressure selected. The temperatures selected in the cathode compartment are likewise as high as possible. The reaction pressure and reaction temperature selected here are such that the alkali metal used as cathode in the preferred embodiment is liquid.

When assembling the electrolysis cell, the alkali metal is preferably in the form of a solid reservoir when introduced into the anode compartment. At the start of the electrolysis, the alkali metal is then melted. However, it is also possible for the alkali metal to be introduced in liquid form into the cathode space at the start of the electrolysis.

The present invention therefore also provides an electrolysis cell as described above, wherein
 a) the at least one alkali metal salt of the aqueous solution of the anode compartment is a lithium salt or a mixture made from two or more of these, and the cathode is composed of lithium, or
 (b) the at least one alkali metal salt of the aqueous solution of the anode compartment is a sodium salt or a mixture made from two or more of these, and the cathode is composed of sodium, or
 (c) the at least one alkali metal salt of the aqueous solution of the anode compartment is a potassium salt or a mixture made from two or more of these and the cathode is composed of potassium.

In a more preferred embodiment, the cathode compartment comprises at least one cathode which is separated from the solid electrolyte by a liquid electrolyte.

Cathode materials which may be used in the novel cell are essentially any suitable material. Examples of these include steel, pure nickel, for example with DIN material number 2.4066, and electrode graphite. In one preferred embodiment of the novel cell the cathode has been manufactured from steel.

The present invention therefore also provides an electrolysis cell as described above, wherein the cathode is a steel cathode and is separated from the solid electrolyte by a liquid electrolyte.

Suitable steels include stainless steel, austenitic steel and unalloyed steel. Preferred austenitic steels include the steels with DIN material numbers 1.4541 and 1.4571, and preferred unalloyed steels include the steels with DIN material numbers 1.0305 and 1.0346. One particularly preferred embodiment of the novel electrolysis cell uses unalloyed steels.

In a more preferred embodiment, the cathode is a rod which has been built into the solid electrolyte tube. The manner of building in the rod is preferably such that a gap of from 1 to 6 mm arises between the solid electrolyte and the rod.

The cathode in the novel cell may, of course, have any other desired shape. For example, it may be a tube, a wire grid or an expanded metal.

In the novel process the alkali metal is produced at the solid cathode. The metal rises at the cathode which in the preferred embodiment is a rod in the liquid electrolyte and can be drawn off as a pure metallic phase.

It is appropriate for the liquid electrolyte selected to be resistant to alkali metal. It is preferable to use a liquid electrolyte which is not consumed during the electrolysis reaction. In one particularly preferred embodiment, an electrolyte melt is used as liquid electrolyte.

In one preferred embodiment, the present invention therefore provides an electrolysis cell as described above, wherein the liquid electrolyte is an electrolyte melt.

Depending on which alkali metal is prepared using the novel electrolysis cell, it is appropriate for various electrolyte melts to be used as liquid electrolyte. The novel electrolysis cells preferably use an LiOH melt when preparing lithium, NaOH. melts, $NaNH_2$ melts or a mixture of these when preparing sodium, and KOH melts, $KNH_2$ melts or mixtures of these when preparing potassium.

The present invention therefore provides an electrolysis cell as described above, wherein
 (a) the at least one alkali metal salt of the aqueous solution of the anode compartment. is a lithium salt or a mixture made from two or more of these, and the electrolyte melt is an LiOH melt, or
 (b) the at least one alkali metal salt of the aqueous solution of the anode compartment is a sodium salt or a mixture made from two or more of these and the electrolyte melt has been selected from the group consisting of a NaOH melt, a $NaNH_2$ melt and a mixture of these, or
 (c) the at least one alkali metal salt of the aqueous solution of the anode compartment is a potassium salt or a mixture made from two or more of these and the electrolyte melt has been selected from the group consisting of an KOH melt, an $KNH_2$ melt and a mixture of these.

In one particularly preferred embodiment, these melts or mixtures of these are used in anhydrous form. In a more particularly preferred embodiment the electrolyte melts used comprise mixtures and particularly preferably anhydrous mixtures, and among these preference is given to eutectic mixtures.

It is, of course, possible for the liquid electrolyte to be mixed with one or more suitable additives. Examples include additives which lower melting point. In principle any additive which lowers melting point is suitable if it does not impair the use according to the invention of the electrolysis cell or impair the novel process. Preference is given to additives which lower melting point and for preparing lithium are selected from the group consisting of LiI, LiBr, $Li_2CO_3$ and a mixture made from two or more of these, and for preparing sodium are selected from the group consisting of NaI, NaBr, $Na_2CO_3$ and a mixture made from two or more of these, and for preparing potassium are selected from the group consisting of KI, KBr, $K_2CO_3$ and a mixture made from two or more of these.

The present invention also provides an electrochemical process as described above, wherein the aqueous solution of the at least one alkali metal salt is obtained from alkali metal waste.

For example, organic reactions with lithium produce significant amounts of lithium halides in the form of aqueous solutions. It is also possible for aqueous solutions of various lithium salts, such as lithium halides, lithium sulfate, lithium sulfonates or lithium salts of organic acids, to be reclaimed, for example dissolved out, from lithium ion batteries. Another possibility for reclaiming lithium salt solutions of this type is acid digestion of the electrolytes and electrodes used in batteries, for example by hydrochloric acid or sulfuric acid. In one preferred embodiment, the lithium waste is converted by, for example, hydrochloric acid into an aqueous lithium chloride solution.

We claim:
1. An electrolysis cell comprising an anode compartment which comprises an aqueous solution of at least one alkali metal salt, a cathode compartment and a solid electrolyte which separates the anode compartment and the cathode compartment from one another, wherein that part of the surface of the solid electrolyte which is in contact with the anode compartment and/or that part of the surface of the solid electrolyte which is in contact with the cathode compartment has/have at least one further ion-containing layer.

2. An electrolysis cell as claimed in claim 1, wherein
 (a) the at least one alkali metal salt is a lithium salt or a mixture made from two or more of these, and the solid electrolyte has been selected from the group consisting of lithium-β-aluminum oxide, lithium-β"-aluminum oxide, lithium-β/β"-aluminum oxide, lithium analogs of NASICON ceramics, LISICONs and Li-ion conductors with perovskite structure, or
 (b) the at least one alkali metal salt is a sodium salt or a mixture made from two or more of these, and the solid electrolyte has been selected from the group consisting of sodium-β-aluminum oxide, sodium-β"-aluminum oxide, sodium-β/β"-aluminum oxide, and NASICON ceramics, or
 (c) the at least one alkali metal salt is a potassium salt or a mixture made from two or more of these, and the solid electrolyte has been selected from the group consisting of potassium-β-aluminum oxide, potassium-β"-aluminum oxide, potassium-β/β"-aluminum oxide and potassium analogs of NASICON ceramics.

3. An electrolysis cell as claimed in claim 1, wherein the at least one ion-conducting layer which relates to that surface of the solid electrolyte which is in contact with the anode compartment is a polymer electrolyte, a ceramic electrolyte, a compound which intercalates the alkali metal ions of the at least one alkali metal salt as claimed in claim 1, or a mixture made from two or more of these.

4. An electrolysis cell as claimed in claim 2, wherein the at least one ion-conducting layer which relates to that surface of the solid electrolyte which is in contact with the anode compartment is a polymer electrolyte, a ceramic electrolyte, a compound which intercalates the alkali metalions of the at least one alkali metal salt, or a mixture made from two or more of these.

5. An electrolysis cell as claimed in claim 1, wherein the at least one ion-conducting layer which relates to that surface of the solid electrolyte which is in contact with the cathode compartment is an alkali metal salt, where the alkali metal is identical with that of the alkali metal salt as claimed in claim 1, a compound which intercalates the alkali metal ions of the at least one alkali metal salt as claimed in claim 1, or a mixture made from two or more of these.

6. An electrolysis cell as claimed in claim 2, wherein the at least one ion-conducting layer which relates to that surface of the solid electrolyte which is in contact with the cathode compartment is an alkali metal salt, where the alkali metal is identical with that of the alkali metal salt, a compound which intercalates the alkali metal ions of the at least one alkali metal salt, or a mixture made from two or more of these.

7. An electrolysis cell as claimed in claim 3, wherein the at least one ion-conducting layer which relates to that surface of the solid electrolyte which is in contact with the cathode compartment is an alkali metal salt, where the alkali metal is identical with that of the alkali metal salt, a compound which intercalates the alkali metal ions of the at least one alkali metal salt, or a mixture made from two or more of these.

8. An electrolysis cell as claimed in claim 4, wherein the at least one ion-conducting layer which relates to that surface of the solid electrolyte which is in contact with the cathode compartment is an alkali metal salt, where the alkali metal is identical with that of the alkali metal salt, a compound which intercalates the alkali metal ions of the at least one alkali metal salt, or a mixture made from two or more of these.

9. An electrolysis cell as claimed in claim 5, wherein
 (a) the at least one alkali metal salt is a lithium salt or a mixture made from two or more of these, and
  (bb) the compound which intercalates lithium ions is graphite $C_6Li$ or a mixture of these, or
 (b) the at least one alkali metal salt is a sodium salt or a mixture made from two or more of these, and
  (aa) the alkali metal salt which relates to that surface of the solid electrolyte which is in contact with the cathode compartment has been selected from the group consisting of NaOH, $NaNH_2$, NaCl, NaBr, NaI, NaOR and a mixture made from two or more of these,
  (bb) the compound which intercalates sodium is graphite, $C_8Na$ or a mixture of these, or
 (c) the at least one alkali metal salt is a potassium salt or a mixture made from two or more of these, and
  (aa) the alkali metal salt which relates to that surface of the solid electrolyte which is in contact with the cathode compartment has been selected from the group consisting of KOH, $KNH_2$, KCl, KBr, KI, KOR and a mixture made from two or more of these,
  (bb) the compound which intercalates potassium ions is graphite, $C_8K$ or a mixture of these,
where R is straight-chain or branched-chain alkyl having from 1 to 5 carbon atoms.

10. An electrolysis cell as claimed in claim 1, wherein
 (a) the at least one alkali metal salt as claimed in claim 1 is a lithium salt or mixture made from two or more of these, and the cathode is composed of lithium, or
 (b) the at least one alkali metal salt as claimed in claim 1 is a sodium salt or a mixture made from two or more of these, and the cathode is composed of sodium or
 (c) the at least one alkali metal salt as claimed in claim 1 is a potassium salt of a mixture made from two or more of these and the cathode is composed of potassium.

11. An electrolysis cell as claimed in claim 1, wherein the cathode is a steel cathode and is separated from the solid electrolyte by a liquid electrolyte, preferably an electrolyte melt.

12. An electrolysis cell as claimed in claim 11, wherein the at least one alkali metal salt is a lithium salt or a mixture made from two or more of these, and the electrolyte melt is an LiOH melt, or the at least one alkali metal salt is a sodium salt or a mixture made from two or more of these and the electrolyte melt has been selected from the group consisting of an NaOH melt, an NaNH2 melt and a mixture of these, or the at least one alkali metal salt is a potassium salt or a mixture made from two or more of these and the electrolyte melt has been selected from the group consisting of a KOH melt, a KNH2 melt and a mixture of these.

13. A process for preparing an alkali metal from an aqueous solution comprising at least one salt of this alkali metal, using an electrolysis cell as claimed in claim 1.

14. A process for preparing an alkali metal from an aqueous solution comprising at least one salt of this alkali metal, using an electrolysis cell as claimed in claim 2.

15. A process for preparing an alkali metal from an aqueous solution comprising at least one salt of this alkali metal, using an electrolysis cell as claimed in claim 3.

16. A process for preparing an alkali metal from an aqueous solution comprising at least one salt of this alkali metal, using an electrolysis cell as claimed in claim 4.

17. A process for preparing an alkali metal from an aqueous solution comprising at least one salt of this alkali metal, using an electrolysis cell as claimed in claim 5.

18. A process for preparing an alkali metal from an aqueous solution comprising at least one salt of this alkali metal, using an electrolysis cell as claimed in claim 6.

19. A process for preparing an alkali metal from an aqueous solution comprising at least one salt of this alkali metal, using an electrolysis cell as claimed in claim 9.

20. A process for preparing an alkali metal from an aqueous solution comprising at least one salt of this alkali metal, using an electrolysis cell as claimed in claim 10.

21. A process for preparing an alkali metal from an aqueous solution comprising at least one salt of this alkali metal, using an electrolysis cell as claimed in claim 12.

22. A process as claimed in claim 13, wherein the aqueous solution of the at least one alkali metal salt is obtained from alkali metal waste.

23. A process as claimed in claim 13, wherein an aqueous solution of a lithium salt is obtained from lithium waste.

* * * * *